United States Patent [19]

Beck et al.

[11] 3,862,131
[45] Jan. 21, 1975

[54] AMINES AND PROCESSES FOR THEIR MANUFACTURE

[75] Inventors: Dieter Beck, Basel; Raymond Bernasconi, Oberwil/Bl; Karl Schenker, Binningen; Angelo Storni; Max Wilhelm, both of Allschwil, all of Switzerland

[73] Assignee: Ciba-Geigy Corporation, Ardsley, N.Y.

[22] Filed: Feb. 17, 1972

[21] Appl. No.: 227,277

[30] Foreign Application Priority Data
Feb. 23, 1971 Switzerland.......................... 2577/71
Jan. 7, 1972 Switzerland............................ 668/72

[52] U.S. Cl....260/326.14 T, 260/240 TC, 260/340.5, 260/340.6, 260/343.7, 260/348 R, 260/456 R, 260/501.1 Y, 260/501.11, 260/501.21, 260/566 F, 260/567.5, 260/567.6 N, 260/570.8 TC, 260/599, 260/618 F, 260/644 R, 424/244, 424/316, 424/330
[51] Int. Cl............................................. C07c 87/78
[58] Field of Search....... 260/326.14, 501.1, 501.21, 260/501.11, 343.7, 570.8 R

[56] References Cited
UNITED STATES PATENTS
3,489,799   1/1970   Schmidt et al................. 260/570.8 X Primary Examiner—Robert V. Hines
Attorney, Agent, or Firm—Joseph G. Kolodny; Theodore O. Groeger; John J. Maitner

[57] ABSTRACT

The present invention provides 9-(3-R-1-propenyl)-9,10-dihydro-9,10-ethano-anthracenes containing the nucleus of the formula

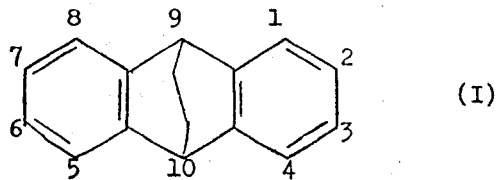

(I)

wherein R denotes a secondary or tertiary amino group, and their pharmaceutically acceptable salts, useful as pharmacological agents, especially as psychotropics, for example, antidepressives.

6 Claims, No Drawings

AMINES AND PROCESSES FOR THEIR MANUFACTURE

Summary of the Invention

The present invention provides a 9-(3-R-1-propenyl)-9,10-dihydro-9,10-ethano-anthracene containing the nucleus of the formula

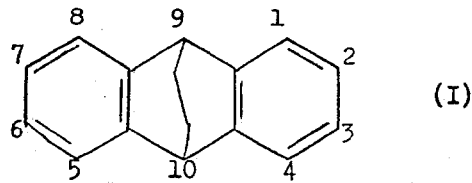

(I)

wherein R denotes a secondary of tertiary amino group, and processes for their manufacture.

An N-monosubstituted amino group may be described as a secondary amino group and an N-disubstituted amino group as a tertiary amino group. Possible substituents are particularly hydrocarbon radicals of aliphatic character which may be interrupted by hetero-atoms for example, oxygen, sulphur or nitrogen and maybe unsubstituted or may contain substituents selected from oxo, hydroxyl and amino groups. Hydrocarbon radicals of aliphatic character are radicals of which the first member, bonded to the nitrogen atom, is not a member of an aromatic system. Radicals of this nature are, for example, aliphatic and cycloaliphatic hydrocarbon radicals and especially lower radicals of this nature.

The term "lower aliphatic hydrocarbon radicals" is used to define radicals which contain up to 7, and above all from 1 to 4 carbon atoms. The term "lower cycloaliphatic hydrocarbon radicals" is used to define radicals which possess from 3 to 7, and in particular 5 or 6, ring carbon atoms. The word "lower" used herein in conjunction with other groups containing carbon is to be understood to have the same meanings as have been indicated for hydrocarbon radicals. The hydrocarbon radicals can be saturated or unsaturated.

As radicals of the above type, there should above all be mentioned: lower alkyl and alkenyl radicals, especially radicals with not more than 7 carbon atoms, for example, methyl, ethyl, propyl and isopropyl radicals, straight and branched chain butyl, pentyl, hexyl and heptyl radicals bonded in any desired position; lower hydroxyalkyl radicals, for example, 2-hydroxyethyl and 3-hydroxypropyl radicals; allyl and methallyl radicals, lower cycloalkyl and cycloalkenyl radicals which are unsubstituted or contain one, two or more lower alkyl substituents, for example, cyclopentyl, cyclohexyl, cyclopropyl, cyclopentenyl and cyclohexenyl radicals, lower cycloalkyl-alkyl and cycloalkenyl-alkyl radicals which are unsubstituted or contain one, two or more lower alkyl substituents, for example, cyclopentyl-and cyclohexenyl-methyl, -ethyl and -propyl radicals.

Divalent radicals are particularly lower alkylene and alkenylene radicals which may be unsubstituted or substituted by hydroxyl, oxo and/or amino groups, and especially radicals which contain from 3 to 7 preferably 4, 5 or 6, chain members and which accordingly form 4–8 membered, and preferably 5–, 6– or 7–membered rings with the nitrogen atom of the amino groups. Such radicals are, for example, 1,4-butylene, 1,4-pentylene, 1,4-hexylene; 1,5-pentylene, for example, 1,5-dimethyl-1,5-pentylene, 3-methyl-1,5-pentylene, 1,5-pentenylene, 1,6-hexylene and 1,5-hexylene radicals. Radicals of this nature interrupted by hetero-atoms are especially radicals in which the hetero-atom is separated from both ends of the chain by at least two carbon atoms, that is to say in which the chain contains more than 4, and preferably 5, members and accordingly forms a more than 5-membered and preferably 6-membered ring with the nitrogen atom. As examples there may be mentioned:

Lower oxaalkylene, azaalkylene and thiaalkylene radicals which may be unsubstituted or substituted by hydroxyl, oxo and/or amino groups, for example, 3-aza-, 3-oxa-and 3-thia-1,5-pentylene radicals, such as, for example, 2,4-dimethyl-3-thia-1,5-pentylene, 1,5-dimethyl-3-aza-1,5-pentylene, 3-lower alkyl-3-aza-1,5-pentylene, for example, 3-methyl-3-aza-1,5-pentylene, 3-hydroxy-lower alkyl-3-aza-1,5-pentylene, for example, 3-hydroxyethyl-3-aza-1,5-pentylene, 3-oxa-1,6-hexylene and 3-aza-1,6-hexylene radicals.

The amino group is particularly a mono- or di-lower alkylamino group, for example, the monopropylamino or dipropylamino group, or preferably the monoethylamino or diethylamino group, but especially the dimethylamino group and advantageously the monomethylamino group, or the N-methyl-N-ethylamino group, a cycloalkylamino group, for example, the cyclopropylamino, cyclobutylamino, cyclopentylamino, or cyclohexylamino group, or a pyrrolidino or piperidino group which may be unsubstituted or C-lower alkylated and/or β-singly unsaturated in the ring, or an unsubstituted or C-lower alkylated piperazino, N'-lower alkyl-piperazino, for example, N'-methyl-piperazino, or N'-(hydroxy-lower alkyl-)-piperazino, for example, N'-(β-hydroxythyl)-piperazino, thimorpholino or morpholino group. The term "C-lower alkylated" denotes herein, that the radical in question is substituted at C atoms by lower alkyl radicals, for example, those mentioned, and especially by $C_{1-3}$—alkyl radicals.

The 1-propenyl radical which is substituted in the 9-position of the anthracene nucleus is preferably only substituted by the amino group R, but can also be substituted yet further by lower alkyl radicals, for example, those mentioned, above all by methyl or ethyl radicals. The 1-propenyl radical mentioned preferably possesses not more than one such lower alkyl radical as a substituent. The double bond of this 1-propenyl radical can be in the E-configuration, but is preferably in the Z-configuration.

In the compounds of the invention, the positions 11 and/or 12 can be substituted by lower alkyl radicals, for example, those mentioned, but these positions are preferably unsubstituted.

The compounds of the invention are preferably unsubstituted in positions 1 to 8 of the anthracene ring but can carry substituents in these positions, for example, substituents selected from lower alkyl, lower alkoxy, lower alkenyloxy, lower alkylmercapto, lower alkylsulphonyl, lower alkanoyl but especially trifluoromethyl groups and halogen atoms, for example, fluorine, bromine and iodine atoms, and preferably chlorine atoms. Possible alkyl radicals are in particular, methyl, ethyl, propyl, isopropyl, butyl, i-butyl and tertiary butyl radicals. Alkoxy or alkenyloxy groups are methoxy, ethoxy, allyloxy or methylenedioxy groups; alkylmercapto groups are methyl or ethyl mercapto groups and alkanoyl radicals are especially acetyl, propionyl or butyryl radicals. There may be several substituents in positions 1 to 8, but preferably two and especially one. Preferred positions for substituents are the 3-position and particularly the 2-position.

In the 10-position the compounds of the invention may possess, for example, an aliphatic hydrocarbon radical, for example one of the abovementioned lower alkyl or alkenyl radicals, or a halogen atom, especially a chlorine atom, but the 10-position is preferbly unsubstituted.

Especially useful are compounds of the general formula Ia

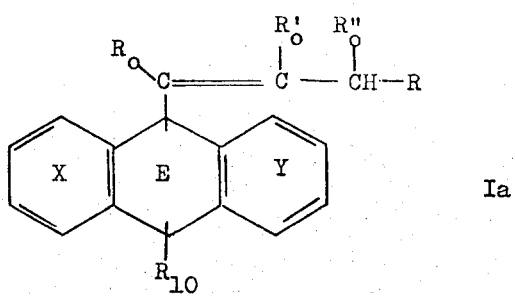

Ia wherein R has the above meanings and the rings X and Y may each be unsubstituted or substituted by up to 4 substituents, which may be the same or different, selected from the groups mentioned above as substituents for positions 1 to 8, the sum of the substituents in the rings X and Y preferably not exceeding 3, the ring X containing, for example, 2 substituents, preferably 1, and advantageously both ring X and ring Y is unsubstituted. When a single substituent is present in either or both of the rings X and Y, it is preferably in the 3-position and advantageously in the 2-position, $R_{10}$ denotes one of the groups mentioned above as substituents of the 10-position or especially denotes a hydrogen atom and the symbols $R_o$ $R_o'$ and $R_o''$ represent lower alkyl radicals, for example, those mentioned, for example, ethyl groups, but particularly methyl groups, or especially represent hydrogen atoms, with preferably at most one of the three symbols being other than hydrogen, and E denotes a 1,2-ethylene radical which may be unsubstituted or substituted in the 1- and/or 2-position by a lower alkyl radical, for example, by one of those mentioned, for example, a methyl, ethyl, propyl or isopropyl radical, but is preferably unsubstituted. Especially preferred are compounds of the formula Ia, in which the double bond of the 1-propenyl-side chain is in the Z-configuration.

The compounds of the invention possess valuable pharmacological properties, especially a psychotropic, for example, antidepressive, action. Thus, for example, they display a pronounced reserpineantagonistic action, which can be demonstrated in animal experiments, for example, in the drug interaction test in mice on intraperitoneal administration of from 20 to 50 mg/kg, or in the reserpine-ptosis test on intraperitoneal administration of 15–50 mg/kg. The compounds of the invention are therefore useful as psychotropic agents, especially as anti-depressive agents. They are also useful as additives for animal fodder, since they bring about better foodstuff utilisation and an increase in weight of these animals. The compounds of the invention are, however, also useful as intermediate products for the manufacture of other useful compounds, above all pharmacologically active compounds. Thus, for example, the known 9-(amino-propyl)-9,10-dihydro-9,10-ethanoanthracenes (US Pat. No. 3,399,201) are manufactured by catalytically hydrogenating the aliphatic double bond in the compounds of the invention.

Compounds of the formula Ia to be singled out are above all those wherein R denotes an amino group which is singly or doubly substituted by radicals selected from alkyl, hydroxyalkyl, amino-alkyl, alkenyl, lower cycloalkyl and/or cycloalkenyl radicals which are unsubstituted or possess one, two or more lower alkyl substituents; lower cycloalkylalkyl and cycloalkenylalkyl radicals which are unsubstituted or possess one, two or more lower alkyl substituents; or R denotes a 1-azacycloalkyl or 1-azacycloalkenyl radical which contains from 4 to 8 ring members and may be unsubstituted or substituted by one or more hydroxyl, oxo and-/or amino groups or denotes a 1-aza-oxacycloalkyl, 1-aza-thiacycloalkyl or 1-aza-azacycloalkyl radical in which the hetero-atoms are separated by at least two carbon atoms and which may be unsubstituted or substituted by hydroxy, oxo and/or amino groups.

Particularly useful compounds of the formula Ia are those wherein R denotes a mono-lower alkylamino or di-lower alkylamino group, a hydroxy-lower alkalmino group, 1-azacycloalkyl group with from 5 to 7 ring members of cycloalkylamino group with from 3 to 7 ring members, or morpholino, thiomorpholino, N'-lower alkyl-piperazino or N'-(hydroxy-lower alkyl)-piperazino group each of which may be unsubstituted or C-lower alkylated, $R_A$ represents lower alkyl, alkoxy or trifluoromethyl groups or, preferably, halogen atoms for example, bromine atoms or especially chlorine atoms, and $R_{10}$ denotes a halogen atom, preferably a chlorine atom, or particularly a hydrogen atom.

Compounds of special value are those of the formula

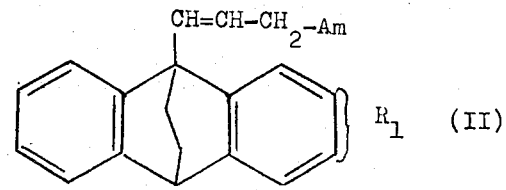

wherein $R_1$ is preferably in the 2-position and represents a lower alkyl or alkoxy group, a trifluoromethyl group, a bromine atom or especially a chlorine atom, but above all a hydrogen atom, and Am represents an amino group which is monosubstituted by a $C_{3-7}$-cycloalkyl radical or is monosubstituted or disubstituted by $C_{1-6}$-alkyl groups or represents a pyrrolidino, piperidino, morpholino, N'-methyl-piperazino, N'-ethyl-piperazino or N'-(β-hydroxyethyl)-piperazino group, each of which may be unsubstituted or C-lower alkylated.

Among the compounds of the formula II, those in which $R_1$ is in the 2-position and Am denotes a mono- or di-lower alkylamino group, wherein the lower alkyl radicals contain from 1 to 4 carbon atoms, are of particular importance.

Valuable compounds are in particular those of the formula

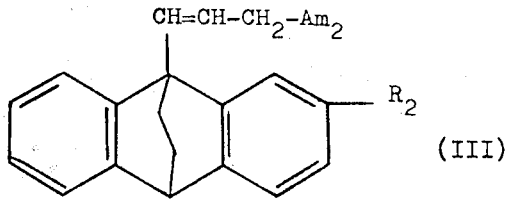

wherein $R_2$ represents a methoxy group or a trifluoromethyl group, but preferably a chlorine atom or above all a hydrogen atom, and $Am_2$ denotes the diethylamino or monoethylamino group but especially the dimethylamino group or particularly the monomethylamino group, above all 9-(3-methylamino-1-propenyl)-9,10-dihydro-9,10-ethano-anthracene, which, for example, in the drug interaction test in mice shows a distinct reserpine-antagonistic action on intraperitoneal administration of 40 mg/kg.

Particularly valuable are compounds of the formulae Ia, II and III, in which R, $R_A$, $R_o$, $R_o'$, $R_o''$, $R_1$, $R_2$, $R_{10}$, Am, $Am_2$, n and m have the meanings given above and in which the double bond in the propenyl radical is in the Z-configuration, but especially the 9-(3-dimethylamino-(Z)-1-propenyl)-9,10-dihydro-9,10-ethano-anthracene of the formula

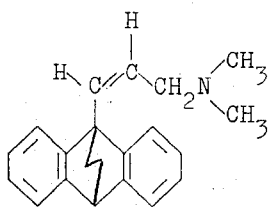

and very particularly the 9-(3-methylamino-(Z)-1-propenyl)-9,10-dihydro-9,10-ethano-anthracene of the formula

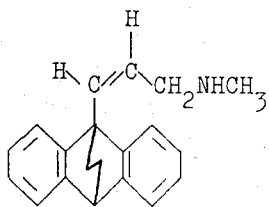

which shows a distinct reserpine-antagonistic action at a dose of 30 mg/kg on intraperitoneal administration and in the reserpine-ptosis test in rats at 25 mg/kg on intraperitoneal administration.

The compounds of the invention may be obtained according to methods which are in themselves knows. The term "known" is used herein to mean in actual use in the art or described in the literature of the art.

Thus, for example, a possible procedure is that in which, in a 9-X-9,10-dihydro-9,10-ethano-anthracene, wherein X denotes a radical which can be converted into a 3-R-1-propenyl group,
X is converted into a 3-R-1-propenyl group, R having the indicated meaning. The radical X is, for example, a 1-propenyl radical which is substituted in the 3-position by a reactively esterified hydroxyl group Z. A reactively esterified hydroxyl group Z is above all a hydroxyl group esterified by a strong organic or inorganic acid, for example, in particular, a hydrohalic acid, for example, hydrochloric, hydrobromic or hydriodic acid, or with an arylsulphonic acid, for example a benzenesulphonic acid which has one, two or more substituents selected from lower alkyl and alkoxy radicals, for example, those mentioned above, and halogen atoms, for example chlorine or bromine atoms, for example, with p-toluenesulphonic acid or p-bromobenzenesulphonic acid, or with a lower alkanesulphonic acid, for example, methanesulphonic acid.

The conversion of the radical Z into the amino group R is effected, for example, by reaction with an amine of the formula HR, wherein R has the indicated meaning.

The reaction is carried out in the usual manner, preferably in the presence of a solvent and optionally in the presence of a condensation agent, for example, a basic condensation agent, preferably at elevated temperature and optionally in a closed vessel under pressure. A basic condensation agent is, for example, an alkali hydroxide or alkali carbonate, for example, sodium hydroxide or potassium carbonate, or a tertiary amine, for example, triethylamine or pyridine. Instead of a secondary amine, it is also possible to use an agent which releases such an amine, for example, a symmetrically disubstituted urea. In this case the reaction is preferably carried out with heating and optionally with addition of an inert diluent, for example, diphenyl-ether or sand.

The radical X can furthermore, for example, be an N-unsubstituted 3-amino-1-propenyl group which is converted into a N-monosubstituted 3-amino-1-propenyl group by replacement of a hydrogen atom. The replacement is effected in the usual manner, for example, by reaction with a reactive ester of an appropriate alcohol. A reactive ester is above all an ester derived from a strong organic or inorganic acid, for example, especially one of the abovementioned acids, or sulphuric acid.

A β-hydroxyalkylamine can also be obtained, for example, by reaction with an appropriately substituted ethylene oxide.

The radical X can also be a radical which can be converted into a 3-R-1-propenyl group by reduction. Such a radical is, for example, a radical corresponding to the 3-R-1-propenyl group, which possesses at least one oxo group which may be reactively modified.

The reduction of one or more optionally reactively modified oxo groups to give the corresponding compound containing in each case two hydrogen atoms instead of the oxo groups can be carried out in the usual manner. For example, a free oxo group can be reduced with a metallic reducing agent for example, zinc and a mineral acid, for example, hydrochloric acid, or with zinc amalgam and hydrochloric acid, preferably concentrated hydrochloric acid, in accordance with the method of Clemmensen, to give two hydrogen atoms in each case.

A suitable reactively modified oxo group is, for example, a hydrazono group, semicarbazono group or two geminal alkylmercapto groups, for example two geminal methylmercapto or ethylmercapto groups, or an ethylene-1,2-dimercapto group.

A hydrazono or semicarbazono group can be reduced in the usual manner, for example, with an alkali alcoholate, for example, sodium ethylate, preferably under pressure and at an elevated temperature, in accordance with the method of Wolff-Kishner, or by heating a compound containing a hydrazono group with an alkali metal hydroxide, for example, sodium hydroxide or potassium hydroxide, in a high-boiling solvent, for example diethylene glycol or triethylene glycol, in accordance with the method of Huang-Minlon or Soffer. Herein, it is also possible instead of using the hydrazono compound to use a free oxo compound directly, which then, for example, transiently forms a hydrazone with hydrazine and alkali hydroxide.

The mercapto group mentioned can be reduced to two hydrogen atoms each in the usual manner, for example, by means of Raney nickel and hydrogen in accordance with the thioacetal method, or with zinc amalgam in hydrochloric acid, preferably concentrated hydrochloric acid. If an oxo group is present adjacent to the nitrogen atom, in which case a methyl group substituted by an oxo group can be substituted yet further by an alkoxy group, for example a methoxy or ethoxy group, that is to say if X is, for example, an appropriate 2-carbamylvinyl group or an appropriate 3-acylamino-1-propenyl group, for example, a urethane grouping, the reduction can be carried out in the manner, for example, with an amide reducing agent, for example, with a simple or complex hydride, for example, a borane, or a complex di-light metal hydride, especially an alkali metal-aluminium hydride, for example, lithium- or sodium-aluminium hydride, or an alkoxyaluminium hydride or -boro-hydride, for exmple, sodium dibutoxyaluminium hydride or sodium trimethoxyborohydride, or with an alkaline earth metal-aluminium hydride, for example, magnesium-aluminium hydride or sodium borohydride in a tertiary amine, for example, pyridine or triethylamine, or aluminium hydride-aluminium chloride. The reduction can, for example, also be carried out electrolytically on a cathode of high overvoltage, for example, a mercury, lead amalgam or lead cathode. The catholyte used is, for example, a mixture of water, sulphuric acid and a lower alkanecarboxylic acid, for example, acetic acid or propionic acid. The anode can consist, for example, of platinum, carbon or lead, and sulphuric acid is preferably used as the anolyte. The conditions must be so chosen that the double bond of the 1-propenyl radical is not attacked.

Another radical which can be converted by reduction into an N-monosubstituted 3-R-1-prpenyl group is, for example an N-monosubstituted 3-amino-1-propenyl radical which additionally carries, on the nitrogen atom, a radical Y which can be split off by reduction. The conversion is effected by reduction which is carried out in the usual manner.

Y is, for example, an α-aralkyl radical, for example, a benzyl radical, or an α-aralkoxycarbonyl radical, for example, a carbobenzoxy radical, whichh can, for example, be split off by hydrogenolysis, for example, by reduction with catalytically activated hydrogen, for example, hydrogen in the presence of a hydrogenation catalyst, for example, a palladium catalyst or platinum catalyst. The conditions for this must be so chosen that the double bond of the 1-propenyl radical is not attacked. Y can, however, be a 2-halogenoalkoxycarbonyl radical such as, for example, the 2,2,2-trichloroethoxycarbonyl radical or the 2-iodoethoxycarbonyl radical, which can be split off by reduction. Reduction is preferably carried out by metallic reduction (so-called nascent hydrogen), such as, for example, the action of metals or metal alloys, including also amalgams, preferably in the presence of hydrogen-releasing agents, such as carboxylic acids, alcohols, or water. Zinc or zinc alloys in acetic acid are preferably used. It is further possible to use chromous compounds, for example, chromous chloride or chromous acetate. Y can also be an arylsulphonyl group, for example, the toluenesulphonyl group, which can be split off in the usual manner, by metallic reduction, for example, by means of an alkali metal, for example, lithium or sodium, in liquid ammonia. The splitting off of an arylsulphonyl group can also be effected by means of a hydride, for example, one of the abovementioned simple or complex hydrides, preferably lithium aluminium hydride, appropriately in the presence of an inert solvent, for example, an ether, for example, tetrahydrofurane.

A further radical which can be converted by reduction into a 3-R-1-propenyl group is a radical corresponding to the said group in which the nitrogen atom is bonded to one of its substituents by a double bond and may carry a positive charge, or wherein one of the carbon atoms bonded to the nitrogen atom carries a hydroxyl group, for example, an appropriate 3-amino-or 3-immonium-1-propenyl radical, or an appropriate 3-amino- or 3-ammonium-1-propenyl radical in which the amino group is doubly bonded to one of the amino substituents.

The conversion is effected in the usual manner by reduction, for example, of the azomethine bond. The reduction is carried out in the usual manner, preferably by means of a simple or complex hydride, for example, a borane, a light— or a di-light metal hydride, such as, for example, an alkali metal earth metal hydride, for example, sodium borohydride or lithium aliminium hydride, or of an alkoxy-aluminium hydride or alkoxy borohydride, or with formic acid. It is, however, also possible to carry out the reduction with hydrogen in the presence of a catalyst, for example, a platinum, palladium or nickel catalyst, or of a homogeneous catalyst, for example, a complex rhodium compound, for example, a rhodium chloro-triphenyl-phosphine complex, if the conditions are so chosen that the double bond of the 1-propenyl radical is not attacked. Appropriately, the hydrogen absorption is followed volumetrically and the hydrogenation is stopped after the calculated amount of hydrogen has been taken up.

A further radical which can be converted by reduction into a 3-R-1-propenyl group and especially into a 3-R-(Z)-1-propenyl group is a radical corresponding to said group in which the double bond is replaced by a triple bond and which is, therefore, a 3-R-1-propenyl group.

The transformation is carried out in a known manner by a selective reduction of the triple bond to the double bond, preferably in an inert solvent with hydrogen in the presence of a catalyst, such as for example, Lindlar catalyst, Raney-Nickel, Palladium which was precipitated for example on an earth alkali carbonate or sulfate, such as calcium carbonate or barium sulfate, as a carrier, and can be poisoned for example with an organic base such as quinoline. The reaction conditions are chosen in such a way, that the formed 1-propenyl group is not reduced further, for example by interrupting the hydrogenation after the uptake of the calculated amount of hydrogen. A suitable selection of the reaction conditions can result in the formation of the double bond preferably in the (Z)-configuration.

Furthermore, the triple bond can also be reduced with a hydride, such as the diisobutyl-aluminum-hydride, or a borohydride, such as diborane or especially the bis-3-methyl-2-butyl-borane. Such a hydride is added to the triple bond in an inert solvent, and the resulting addition-product is decomposed with water or acid, such as acetic acid, to the desired 3-R-(Z)-1-propenyl group.

The radical which can be converted into an N-monosubstituted 3-R-1-propenyl group can also be an N-monosubstituted 3-amino-1-propenyl radical which additionally carries, on the nitrogen atom, a radical Y' which can be split off by hydrolysis. The conversion is effected by splitting off Y' by hydrolysis. The radical Y' is, for example, a silyl radical, for example, a trimethylsilyl radical, or particularly an acyl radical, for example, an alkanoyl radical, and especially a lower alkanoyl radical, which may be unsubstituted or halogenated, for example, fluorinated, for example, an acetyl or trifluoroacetyl radical, a benzoyl radical, a phenylalkanoyl radical, a carbalkoxy radical, for example, the tertiary butyloxycarbonyl, carboethoxy or carbomethoxy radical, or an aralkoxycarbonyl radical, for example, a carbobenzoxy radical. The radical Y' can, however, also be a doubly bonded radical, for example, an alkylidene or benzylidene group, or a phosphorylidene group, for example a triphenylphosphorylidene group, in which case the nitrogen atom carries a positive charge.

The hydrolytic splitting off of Y' is effected, for example, with a hydrolysing agent, for example, in the presence of an acid agent, such as, for example, a dilute mineral acid, for example, sulphuric acid or a hydrohalic acid, or, in the case of an acyl radical, preferably in the presence of a basic agent, for example, an alkali metal hydroxide, for example sodium hydroxide.

If Y' is a trifluoroacetyl group, the hydrolysis can also be linked to the introduction of a further substituent and a tertiary amine this obtained, if a reactive ester of an appropriate alcohol, for example, an ester with an acid mentioned above for this purpose, for example, hydriodic acid or methanesulphonic acid, is contained in the reaction mixture together with a base, for example, potassium hydroxide.

X can, however, be a 3-R-1-propyl radical corresponding to the 3-R-1-propenyl radical and possessing removable radicals $Z_1$ and $Z_2$ in positions 1 and 2 respectively. Starting substances which contain such a radical Y, can be converted into the final substances according to the invention by removing the radicals $Z_1$ and $Z_2$.

One of the radicals $Z_1$ and $Z_2$ preferably represents a hydrogen atom and the other represents a radical which can be split off to form a carbonium ion, for example, a free, etherified or esterified hydroxyl group. An etherified hydroxyl group is, for example, a preferably lower alkoxy group or a phenyl-lower alkoxy group, for example, a benzoxy group. An esterified hydroxyl group is, in particular, a hydroxyl group esterified with a strong inorganic or organic acid, for example, one of those mentioned above, above all hydrochloric acid, or a carboxylic acid, for example, a lower alkanoic acid, for example acetic acid or propionic acid, or a benzoic acid.

A free hydroxyl group can be split off in the usual manner, advantageously in the presence of an agent which binds water, especially an acid agent, for example sulphuric acid or zinc chloride, or in the presence of aluminium oxide, preferably at elevated temperature. An esterified or etherified hydroxyl group can be split off in the usual manner, especially in the presence of a strongly basic agent, for example, an inorganic base, for example, a metal hydroxide, or, for example, sodium hydroxide or potassium hydroxide, or a carbonate, for example, sodium carbonate or potassium carbonate, or an organic base, such as, for example, pyridine, or an alkali metal alkanolate, for example, sodium methylate, and optionally at elevated temperature.

A radical $Z_1$ or $Z_2$ which can be split off to form a carbonium ion can, for example, also be a radical which can be split off thermally, for example, a quaternised ammonium group, especially a trialkylammonium group, for example, the trimethylammonium group, an alkylsulphonyl group, above all a lower alkylsulphonyl group, for example, the methylsulphonyl or ethylsulphonyl group, a ternary sulphonium group, for example, a di-lower alkylsulphonium group, for example the dimethylsulphonium group, a dialkylamino-oxode group, for example, the dimethylaminooxide group, a lower alkylmercapto-thiocarbonyloxy group, for example, the methylmercapto-thiocarbonyloxy group, a di-lower alkylthiocarbamoyloxy group, for example a dimethylthiocarbamoyloxy group, an alkoxycarbonyl-, for example, carbomethoxysulphamoyloxy group, or an N'-sulphonylhydrazono group, for example, N'-lower alkylsulphonylhydrazono group or especially an N'-arylsulphonylhydrazono group, for example, the N'-phenylsulphonyl-, N'-4-methylphenyl-sulphonyl- and N'-4-bromophenylsulphonyl-hydrazono group.

The splitting off can be effected by heating, if appropriate in a high-boiling solvent, for example, diethylene- or triethylene-glycol dimethyl ether, and preferably under reduced pressure. The removal of the sulphonylhydrazono group is appropriately carried out after forming an alkali compound, for example, in the presence of a strong base, for example, sodium alkanolate or sodium glycollate, or after reaction with a lithium-hydrocarbon compound, for example, butyllithium. The alkoxycarbonylsulphamoyloxy groups are also advantageously present as deprotonised, negatively charged groups for the reaction in which they are removed.

$Z_1$ can, however, have the same meaning as $Z_2$, with both radicals preferably denoting halogen atoms, for example, chlorine or bromine atoms. They are removed in the usual manner, preferably by metallic reduction, for example, with zinc and an acid, for example, acetic acid, or zinc and water or an alcohol, for example, ethanol. They can also be removed with the aid of an aromatic dihydro compound, for example, dihydronaphthalene.

The compounds of the invention can also be obtained if a 9,10-ethano radical is introduced into a 9-(3-R-1-propenyl)-anthracene, wherein R has the indicated meaning.

The 9,10-ethanol radical is introduced in the usual manner. This is appropriately done using ethylene which may be unsubstituted or lower alkylated, according to the method of Diels-Alder, appropriately at elevated temperature and/or under pressure.

In a resulting compound, substituents can be introduced, modified or removed within the scope of the definition of the final substances.

Thus, for example, secondary amines obtained can be converted into tertiary amines, that is, to say substituents, for example, those mentioned above, can be introduced into resulting N-monosubstituted 3-amino-1-propenyl or N'-unsubstituted piperazino groups. The substituents are in particular introduced as indicated above for free 3-amino-1-propenyl groups. The substituents can also be introduced by reduction, for example, by reaction with an appropriate aldehyde or ketone under reducing conditions, for example, in the presence of formic acid.

In resulting compounds, which carry substituents on the aromatic ring of the anthracene skeleton, the substituents can be modified or removed.

In resulting compounds which contain free hydroxyl or mercapto groups, these groups can be etherified. The etherification is carried out in the usual manner, for example, by reaction with a reactive ester of an alkanol, preferably in the presence of a strong base.

The invention also relates to those embodiments of the process in which a compound obtainable as an intermediate product at any stage is used as the starting compund and the missing steps are carried out, or the process is stopped at any stage or a starting substance is formed under the reaction conditions or, if appropriate, is used in the form of a salt and/or racemate or optical antipode.

Thus, for example, it is also possible to start from a 9-(3-oxo-1-propenyl)-9,10-dihydro-9,10-ethano-anthracene and to treat this, under reducing conditions, with an amine of the formula H-R, or to start from an N-unsubstituted 9-(3-amino-1-propenyl)-9,10-dihydro-9,10-ethano-anthracene and to treat this with an appropriate aldehyde or ketone under reducing conditions, for example, in the presence of formic acid. Hereupon, the abovementioned azomethine compounds are formed as intermediate products.

The reactions mentioned are carried out in the customary manner in the presence of absence of diluents, condensation agents and/or catalytic agents, at lowered, ordinary or elevated temperature, and if appropriate in a closed vessel.

Depending on the process conditions and starting substances, the final substances are obtained in the free form or in the form of their acid addition salts, which are also included in the invention. The acid addition salts of the new compounds can be converted into the free compound in a manner which is in itself known, for example by means of basic agents, such as alkalis or ion exchangers. On the other hand, the resulting free bases can form salts with organic or inorganic acids. Acids which are suitable for the formation of therapeutically usable salts are in particular employed for the manufacture of acid addition salts. As examples of such acids there may be mentioned hydrogen halide acids, sulphuric acids, phosphoric acids, nitric acid, perchloric acid, aliphatic, alicyclic, aromatic or heterocyclic carboxylic or sulphonic acids, such as formic, acetic, propionic, succinic, glycollic, lactic, malic, tartaric, citric, ascorbic, maleic, hydroxymaleic or pyruvic acid; phenylacetic, benzoic, p-aminobenzoic, anthranilic, p-hydroxybenzoic, salicyclic or p-aminosalicylic acid, embonic acid, methanesulphonic, ethanesulphonic, hydroxyethanesulphonic and ethylenesulphonic acid; halogenobenzenesulphonic, toluenesulphonic and naphthalenesulphonic acid or sulphanilic acid; methionine, tryptophane, lysine or arginine.

These or other salts of the new compounds, such as, for example, the picrates, can also be used for the purification of the free bases obtained, by converting the free bases into salts, isolating these and again liberating the bases from the salts. Because of the close relationships between the new compounds in the free form and in the form of their salts, the free compounds are to be understood, in the preceding and following text, where appropriate also to include the corresponding salts, as regards general sense and intended use.

Depending on the choice of the starting substances and procedures, the new compounds can be in the form of race-mates or optical antipodes provided they possess at least one asymmetrical carbon atom.

Resulting racemates can be resolved in accordance with known methods, for example, by recrystallisation from an optically active solvent, with the aid of microorganisms or by reaction with an optically active acid which forms salts with the racemic compound and separation of the salts obtained in this manner, for example, on the basis of their differing solubilities, into the diastereo isomers, followed by liberation of the antipodes by the action of suitable agents. The customary optically active acids are, for example, the D- and L-forms of tartaric acid, di-o-toluyltartaric acid, malic acid, mandelic acid, camphorsulphonic acid or quinic acid. Advantageously, the more active of the two antipodes is isolated.

Some of the starting substances are new and some are known. The new starting substances can be obtained by new processes or by processes known to be suitable for the manufacture of analogous compounds. New starting substances and the processes for their manufacture also form a subject of the invention.

The 9-(3-oxo-1-propenyl)-9,10-dihydro-9,10-ethano-anthracenes used as preferred starting substances can be obtained as follows:

An unsubstituted or substituted 9-formyl-anthracene is acetalised, for example, with an ortho-ester, and appropriately in the presence of an acid catalyst, for example, boron trifluoride-diethyl etherate, the acetal thus obtained is reacted e.g. with an ethenyl-ether, for example, ethyl vinyl ether or an ethenyl ester, such as vinyl acetate and the reaction product is decomposed to give an unsubstituted or substituted 3-(9-anthryl)-acrolein. The decomposition can suitably be carried out in the presence of a lower alkanol. As the acid, it is possible to use any desired inorganic or organic acid.

A 3-(9-anthryl)-acrolein compound on reaction with an unsubstituted or lower-alkylated ethylene in the presence of an inert, heat-stable solvent yields an abovementioned 9-(3-oxo-1-propenyl)-9,10-dihydro-9,10-ethano-anthracene.

The reaction is appropriately carried out under pressure and with warming.

The 9-(3-$\bar{Z}$-(E)-1-propenyl)-9,10-dihydro-9,10-ethano-anthracenes, in which $\bar{Z}$ stands for a reactively esterified hydroxyl group, used as particularly preferred starting materials can for example be obtained in the following manner: A 9-(3-hydroxy-(E)-1-propenyl)-9,10-dihydro-9,10-ethano-anthracene, which can be obtained for example from the corresponding aldehyde by a reduction, for example with sodium borohydride, is protected by the formation of the corresponding tetrahydropyranyl ether, the double bond of the side chain is then oxidised to the corresponding epoxide and this epoxide is transformed to the corresponding betain by reaction with diphenyllithium and subsequent methylation with methyl iodide. The resulting betain can be transformed by the application of heat to the 9-(3-$\bar{Z}$-(Z)-1-propenyl)-9,10-dihydro-9,10-ethano-anthracene, in which $\bar{Z}$ stands for the 2-tetrahydropyranyloxy group. The alcohol-protecting group is removed and the free hydroxyl group transformed into a reactively esterified hydroxyl group, such as a mesylate.

The 9-(3-R-1-propynyl)-9,10-dihydro-9,10-ethano-anthracenes which can also be used as starting materials, can for example be prepared as follows: In a 9-(3-oxo-1-propenyl)-9,10-dihydro-9,10-ethanoanthracene, the side chain double bond is brominated, and a double bond is introduced into this dibromide by the elimination of one mole of hydrogen bromide. The aldehyde group is then protected by acetalisation and the triple bond is introduced by the elimination of a second mole of hydrogen bromide. The aldehyde group is deprotected and reduced, for example with sodium borohydride, to the corresponding alcohol. The thus formed hydroxyl group is transformed into a reactively esterified hydroxyl group and then reacted as described above with a primary or a secondary amine to the desired starting materials.

The compounds of the invention can be used, for example, in the form of pharmaceutical preparations in which they are present in the free form or optionally in the form of their salts, especially the physiologically tolerable salts, in admixture or conjunction with a pharmaceutical organic or inorganic, solid or liquid carrier which is suitable, for example, for enteral or parenteral administration. Possible substances for forming the latter are those which do not react with the compounds of the invention, for example, water, gelatine, lactose, starch, stearyl alcohol, magnesium stearate, talc, vegetable oils, benzyl alcohols, gum, propylene glycol, white petroleum jelly or other known medicinal carriers. The pharmaceutical preparations can, for example, be in the form of tablets, dragees, capsules or suppositories or, in a liquid form, as solutions, for example, as an elixir or syrup, suspensions or emulsions. They are optionally sterilised and/or contain auxiliaries, for example, preservatives, stabilisers, wetting agents or emulsifiers, solubilising agents or salts for regulating the osmotic pressure or buffers. They can also contain other pharmaceutically useful substances. The pharmaceutical preparations are formulated in accordance with customary methods.

The compounds of the invention can also be used in veterinary medicine, for example, in one of the above-mentioned forms or in the form of feedstuffs or of additives to animal fodder. Herein, for example, the customary extenders and diluents or feedstuffs are used.

The following Examples illustrate the invention.

EXAMPLE 1

13.65 g of 9-(3-methylimino-1-propenyl)-9,10-dihydro-9,10-ethano-anthracene are suspended in 150 ml of methanol. A solution of 4.0 g of sodium borohydride in 15 ml of water is added dropwise to this suspension, whilst stirring and cooling. During the course of the addition the temperature of the contents of the flask should not exceed 15°C. During the reaction, the Schiff's base rapidly dissolves. The reduction is complete after 30 minutes. 200 ml of water are added and the mixture is extracted three times with 100 ml of methylene chloride at a time. The combined extracts are extracted once by shaking with 50 ml of water, dried over anhydrous sodium sulphate and freed of the solvent in a water pump vacuum. 9-(3-Methylamino-1-propenyl)-9,10-dihydro-9,10-ethano-anthracene of the formula

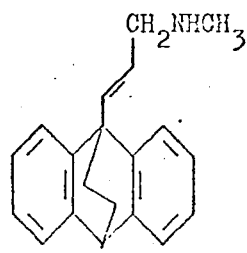

is thus obtained as a colourless viscous oil which crystallises on standing (melting point 78°–80°C).

The methanesulphonate is obtained as colourless crystals of melting point 168°–171°C by neutralising an acetone solution of the base with methanesulphonic acid.

The hydrochloride of the base is manufactured as follows:

The base is dissolved in a five-fold amount of acetone and neutralised by adding one equivalent of hydrogen chloride in ethyl acetate. Hereupon the hydrochloride forms colourless crystals of melting point 241–243°C. After recrystallisation from isopropanol-ether, the melting point rises to 243°–244°C.

The 9-(3-methylimino-1-propenyl)-9,10-dihydro-9,10-ethano-anthracene used as the starting material can be manufactured as follows:

0.8 ml of $BF_3$-diethyl etherate is added to 137.1 g of orthoformic acid triethyl ester, and 164.8 g of anthracene-9-aldehyde are then added in several portions, whilst stirring. The resulting yellow paste is warmed to 40°–45°C, in the course of which a viscous brown-red solution is gradually produced. After 2 hours a start is made on cooling the contents of the flask and at the same time 63.4 g of ethyl vinyl ether are added dropwise at such speed that the temperature of the reaction mixture does not exceed 20°C. After 2 hours, 161 ml of isopropanol and 24 ml of 2 N hydrochloric acid are added and the mixture is heated under reflux for 8 hours. The product starts to crystallise out comparatively rapidly already after about 1–2 hours. The mixture is cooled to 5°C and the rich yellow, fine crystals are filtered off. They are twice washed with 80 ml of isopropanol at a time, once with 80 ml of water and again with 80 ml of isopropanol, and the 3-(9-anthryl)-acrolein is dried for 12 hours at 80 mm Hg/80°C in a vacuum cabinet until it reaches constant weight. The substance is golden yellow and melts at 172°–174°C, and after a single recrystallisation from chloroform-ethyl acetate at 174°–175°C. The yield is 171 g (92% of theory).

232 g (1.0 mol) of 3-(9-anthryl)-acrolein and 1,000 ml of toluene are heated to 170°–180°C in a stirred autoclave. 100 atmospheres gauge of ethylene is then injected and this pressure is maintained for 20 hours. The pressure vessel is allowed to cool to 90°C, the pressure is carefully released, the autoclave contents are treated with 20 g of active charcoal and the warm solution is filtered. The filtrate is evaporated to approx. three-fifths of its volume and is then slowly cooled to 10°C. Hereupon, 9-(3-oxo-1-propenyl)-9,10-dihydro-9,10-ethano-anthracene of the formula

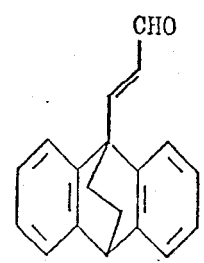

crystallises out. It is filtered off and rinsed with a total of 400 ml of ice-cold toluene. The colourless crystals are dried to constant weight in a vacuum cabinet at 80 mm Hg/100°C (15 hours). The yield is 234.2 g (92% of theory) and the melting point is 174°–176°C. A single recrystallisation from chloroform-ether yields colourless crystals of melting point 175.5°–177°C.

Further pure material can be obtained from the mother liquor by concentration, but the work required is generally hardly worth-while.

The reaction just described can be carried out in the same manner using isopropanol and acetonitrile as the solvent (yield 62.5 and 71.5%). If dimethylformamide is used, at most traces of the desired oroduct are obtained.

Gaseous methylamine is introduced into a suspension of 26.0 g of 9-(3-oxo-1-propenyl)-9,10-dihydro-9,10-ethano-anthracene in 200 ml of methanol whilst stirring. The aldehyde dissolves whilst the mixture becomes warm. The temperature of the reaction mixture rises to 50°–55°C over the course of a few minutes. As soon as the solution reacts strongly alkaline (tested with moist indicator paper), the supply of methylamine is stopped and the solution is left to stand for 30 minutes. On slow addition of 100 ml of water, 9-(3-methylimino-1-propenyl)-9,10-dihydro-9,10-ethano-anthracene of the formula

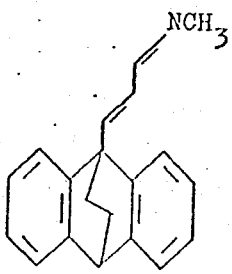

precipitates as crystals. The mixture is cooled to 10°C and suction-filtered, and 26.2 g of colourless crystals of melting point 128°–129°C are thus obtained.

The 9-(3-methylimino-1-propenyl)-9,10-dihydro-9,10-ethano-anthracene used as the starting material can also be manufactured as follows:

A mixture of 11.6 g of 3-(9-anthryl)-acrolein and 9.1 g of a 33% strength solution of methylamine in ethanol, in 80 ml of absolute ethanol, is stirred for 20 minutes and in the course thereof gradually warmed to 40°C. The clear, brown-yellow solution is cooled to 0°C, whereupon dark yellow crystals separate out. These are filtered off and recrystallised from 15 ml of isopropanol and 5 ml of ethyl acetate. 9-(3-Methylimino-1-propenyl)-anthracene is thus obtained as yellow needles of melting point 122.5°–124.5°C.

12.25 g of 9-(3-methylimino-1-propenyl)-anthracene in 150 ml of toluene are heated to 180°C in an autoclave. Ethylene is injected hot up to a pressure of 80 atmospheres gauge and the reaction mixture is left to stand for 20 hours at a pressure of 80 atmospheres gauge and a temperature of 180°C. The mixture is allowed to cool and evaporated in vacuo. Crude 9-(3-methylimino-1-propenyl)-9,10-dihydro-9,10-ethano-anthracene of the formula

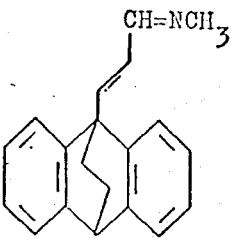

is thus obtained as a brownish amorphous mass which can be employed without further purification for the reaction described above. For characterisation, a sample is crystallised from methanol and recrystallised. The colourless crystals of melting point 128°–129°C are identical in every respect with those described above.

EXAMPLE 2

12.35 g of 9-(3-methylamino-1-propenyl)-anthracene in 120 ml of toluene are heated to 200°C in an autoclave. Ethylene is injected hot up to a pressure of 75 atmospheres gauge and the mixture is left to stand for 35 hours at a pressure of 75 atmospheres gauge and a temperature of 200°C. The brown solution is allowed to cool, filtered through active charcoal and evaporated in vacuo. 9-(3-Methylamino-1-propenyl)-9,10-dihydro-9,10-ethano-anthracene of the formula

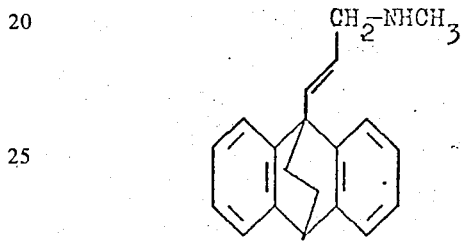

is thus obtained as a brownish amorphous mass.

The hydrochloride of the base is manufactured as in Example 1.

The hydrochloride forms slightly yellowish crystals of melting point 240°–242°C. After recrystallisation from chloroform-isopropanol-ether, colourless crystals of melting point 243°–244°C are obtained. The hydrochloride is identical in every respect with the product described in Example 1.

The 9-(3-methylamino-1-propenyl)-anthracene used as the starting material can be manufactured as follows:

3.8 g of sodium borohydride in 5 ml of water are added to a suspension of 12.25 g of 9-(3-methylimino-1-propenyl)-anthracene whilst stirring and cooling with ice, the temperature not exceeding 15°C during the addition. The mixture is stirred for 30 minutes at 15°C, diluted with 200 ml of water and extracted with three 100 ml portions of methylene chloride. The combined extracts are washed with 50 ml of water, dried over anhydrous sodium sulphate and freed of the solvent in a water pump vacuum. 9-(3-Methylamino-1-propenyl)-anthracene is thus obtained as a yellowish oil, which crystallises completely on trituration. The hydrochloride of the base is manufactured as follows:

The base is dissolved in a five-fold amount of acetone and neutralised by adding one equivalent of hydrogen chloride in ethyl acetate. Hereupon the hydrochloride crystallises in lemon-yellow needles of melting point 277°–279°C. On recrystallisation from methanol-ethanol, the melting point rises to 284°–286°C.

EXAMPLE 3

26.0 g of 9-(3-oxo-1-propenyl)-9,10-dihydro-9,10-ethano-anthracene are converted by means of gaseous methylamine into the Schiff's base as described in Example 1. The resulting solution of the Schiff's base in methanol is hereupon directly reduced, whilst stirring and cooling with ice water, by dropwise addition of a solution of 4.0 g of sodium borohydride in 15 ml of water. Working up takes place in the same manner as described in Example 1. 9-(3-Methylamino-1-propenyl)-9,10-dihydro-9,10-ethano-anthracene of the formula

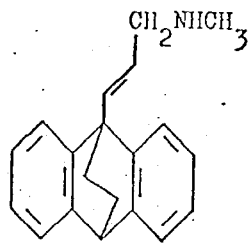

is obtained in the same yield, as a colourless oil. The methanesulphonate manufactured therefrom melts at 168°–171°C and is identical in every respect with the product described in Example 1.

EXAMPLE 4

3.12 g of 9-(3-methylamino-1-propenyl)-9,10-dihydro-9,10-ethano-anthracene hydrochloride in 50 ml of fine spirit are hydrogenated in the presence of 0.3 g of 10% strength palladium on charcoal at 25°C and normal pressure. After 234 ml of hydrogen have been absorbed, the hydrogenation stops. The catalyst is filtered off and the solvent is evaporated in vacuo. 9-(3-Methyl-amino-propyl)-9,10-dihydro-9,10-ethano-anthracene hydrochloride of the formula

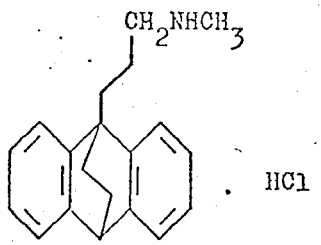

is thus obtained as colourless crystals of melting point 240°–243°C. After recrystallisation from isopropanol, the hydrochloride melts at 243°–244°C. It is identical in every respect with the product of the same melting point described in British Pat. No. 1,069,069.

EXAMPLE 5

13.75 g of 9-(3-methylamino-1-propenyl)-9,10-dihydro-9,10-ethano-anthracene are dissolved in 20 ml of formic acid and the solution is boiled with 4.5 ml of 40% strength formaldehyde solution for 20 hours under reflux. Thereafter, the reaction solution is acidified with 200 ml of 20% strength methanesulphonic acid, the formic acid is distilled off in vacuo, and the aqueous solution is twice extracted with 200 ml of toluene, stirred for 10 minutes with 1 g of animal charcoal at room temperature, filtered through a layer of diatomaceous earth (Hyflo), rendered strongly alkaline with 6 N sodium hydroxide solution and extracted 3 times with 500 ml of chloroform. The combined chloroform solutions are washed with water, dried over sodium sulphate and evaporated. The residue consists of 9-(3-dimethylamino-1-propenyl)-9,10-dihydro-9,10-ethano-anthracene of the formula

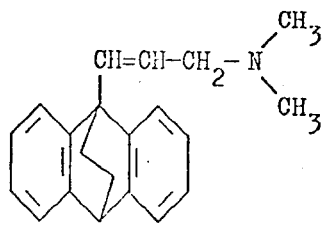

and is converted into the hydrochloride. Melting point 233°–235°C (ethyl acetate).

EXAMPLE 6

13.0 g of 9-(3-oxo-1-propenyl)-9,10-dihydro-9,10-ethano-anthracene are dissolved in 500 ml of absolute ethanol and the solution is boiled with 10.4 g of aminocyclopropane for 2 hours under reflux. The solution is then evaporated in vacuo. The crystalline residue is dissolved in 100 ml of tetrahydrofurane and 500 ml of methanol and reacted with a solution of 3.7 g of sodium borohydride in 25 ml of water. The reaction mixture is vigorously stirred for 5 hours at 20°C and diluted with 200 ml of water, and the organic solvents are evaporated off in vacuo. The concentrate is extracted with chloroform and the organic phase is twice washed with water, dried over sodium sulphate, filtered and evaporated. The 9-(3-cyclo-propylamino-1-propenyl)-9,10-dihydro-9,10-ethano-anthracene thus obtained, of the formula

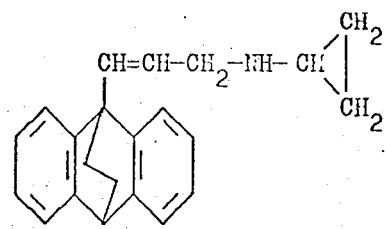

melts at 110°–112°C after recrystallisation from ether. The hydrochloride, manufactured in the usual manner, melts at 222°–224°C.

EXAMPLE 7

2.8 g of 9-(3-chloro-1-propenyl)-9,10-dihydro-9,10-ethano-anthracene in 10 g of freshly distilled N-methyl-piperazine are heated at 100°C for 15 hours. The mixture is then evaporated and the residue is degassed for 2 hours in a high vacuum at 100°C. The oily residue is dissolved in 250 ml of 10% strength methanesulphonic acid and the aqueous phase is twice extracted with toluene, stirred with 1 g of animal charcoal for 10 minutes at 20°C and filtered through a layer of diatomaceous earth (Hyflo). The solution containing methanesulphonic acid is rendered strongly alkaline with 6 N sodium hydroxide solution and is extracted with three 300 ml portions of chloroform. The combined chloroform solutions are washed with water, dried over sodium sulphate and evaporated. The residue is dissolved in a little toluene and chromatographed on 160 g of aluminium oxide (activity II, neutral). 3 litres of toluene are used as the eluting agent. The first fraction yields 9-[3-(N'-methyl-piperazino)-1-propenyl]-9,10-dihydro-9,10-ethano-anthracene of the formula

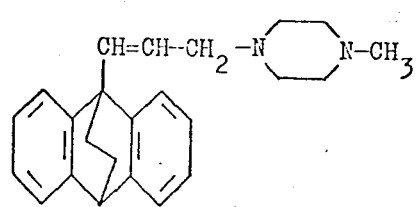

Melting point 139°–141°C (hexane).
The dihydrochloride is manufactured in the usual manner. The product does not have a single melting point. The highest melting point was about 263°–265°C.

The 9-(3-chloro-1-propenyl)-9,10-dihydro-9,10-ethano-anthracene used as the starting material can be manufactured as follows:

2.6 g of 9-(3-oxo-1-propenyl)-9,10-dihydro-9,10-ethano-anthracene are dissolved in 100 ml of methanol and reacted with a solution of 0.5 g of sodium borohydride in 2 ml of water. The solution is stirred for 2 hours at room temperature. The solution is then poured onto 200 g of ice and the aqueous phase is extracted with three 200 ml portions of chloroform. The combined chloroform solutions are washed with water, dried over sodium sulphate and evaporated. The residue after recrystallisation from ether-hexane yields 9-(3-hydroxy-1-propenyl)-9,10-dihydro-9,10-ethano-anthracene as crystals of melting point 141°–142°C.

2,8 g of 9-(3-hydroxy-1-propenyl)-9,10-dihydro-9,10-ethano-anthracene are dissolved in 100 ml of chloroform and 2.2 g of phosphorus pentachloride are introduced in portions. The reaction is exothermic and the temperature rises to 45°–50°C. The reaction mixture is further stirred for 2 hours at 20°C and is poured onto 1 kg of ice. The aqueous phase is extracted twice with 150 ml of chloroform and the combined chloroform solutions are dried over sodium sulphate and evaporated. The residue consists of 9-(3-chloro-1-propenyl)-9,10-dihydro-9,10-ethano-anthracene and can be reacted, without further purification, with N-methylpiperazine.

EXAMPLE 8

5.6 g of 9-(3-chloro-1-propenyl)-9,10-dihydro-9,10-ethano-anthracene are dissolved in 25 ml of dimethylformamide and reacted with 13.0 g of N-(β-hydroxyethyl)-piperazine. The reaction mixture is warmed for 15 hours at 100°C. The mixture is then evaporated in a high vacuum at 120°C. The residue is degassed, dissolved in a little toluene and chromatographed on 300 g of aluminium oxide (activity II, neutral). The eluting agents used are first 3 litres of toluene and then 3 litres of a toluene:chloroform (2:1) mixture. The fractions eluted with this mixture yield pure 9-{3[N'-(β-hydroxyethyl)-piperazino]-1-propenyl -} 9,10-dihydro-9,10-ethano-anthracene of the formula

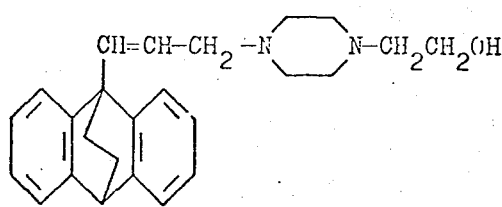

The dihydrochloride, manufactured in the usual manner, does not have a single melting point. The highest melting point was about 245°–247°C.

EXAMPLE 9

1-(3-Methylamino-(Z)-1-propenyl)-9,10-dihydro-9,10-ethano-anthracene hydrochloride 2.25 Grams (6.62 mmols) of 1-(3-hydroxy-(E)-1-propenyl)-9,10-dihydro-9,10-ethano-anthracene-methanesulphonic acid ester are left to stand for 24 hours at room temperature in 100 ml of 10% methylamine solution. The mixture is thereupon diluted with 100 ml of ether and extracted firstly with 25 ml of 2N sodium carbonate solution, then with 3 × 50 ml of water. The organic phase is dried over sodium sulphate and evaporated in a water-jet vacuum, to leave as residue 1-(3-methylamino-(Z)-1-propenyl)-9,10-dihydro-9,10-ethano-anthracene of the formula

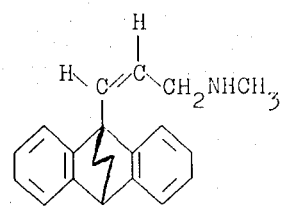

(m.p. 79°–80°C).

For the conversion into the hydrochloride, the free base is dissolved in 25 ml of methylene chloride and an acid reaction to Congo red is attained by treating the resulting solution with ethereal hydrogen chloride solution. The 1-(3-methylamino-(Z)-1-propenyl)-9,10-dihydro-9,10-ethano-anthracene hydrochloride is precipitated with ether, filtered with suction, and recrystallized from methylene chloride/ether; melting point 205°–207°C.

The 1-(3-hydroxy-(E)-1-propenyl)-9,10-dihydro-9,10-ethano-anthracene-methanesulphonic acid ester used as starting material is manufactured as follows:

10.0 Grams (38.4 mmols) of 1-(3-acroleinyl)-9,10-dihydro-9,10-ethano-anthracene are suspended in 250 ml of methanol and, while stirring, the suspension is treated at 15°–20°C with 0.8 g (21.1 mmols) of sodium borohydride in small amounts. Upon completion of the addition, there forms a clear, light yellow solution which is left to stand for 1 hour at room temperature and is then concentrated in a water-jet vacuum. The residue is dissolved in 250 ml of ether and the ether solution is washed until neutral with 3 × 50 ml of water, dried over sodium sulphate, and evaporated in a water-jet vacuum at 40°C, leaving as residue the crude 1-(3-hydroxy-(E)-1-propenyl)-9,10-dihydro-9,10-ethano-anthracene. This product is recrystallized from ether/hexane and melts at 136.5°–137.5°C.

5.2 Grams (20 mmols) of 1-(3-hydroxy-(E)-1-propenyl)-9,10-dihydro-9,10-ethano-anthracene are dissolved in 100 ml of methylene chloride. The solution is treated with 4.4 g (21.7 mmols) of 85% m-chloroperbenzoic acid and the mixture stirred for 24 hours at room temperature. The batch is then treated with 25 ml of 2N sodium hydroxide solution, the layers are separated, and the organic phase is washed until neutral with 2 × 25 ml of water, dried over sodium sulphate, and the methylene solution evaporated in a water-jet vacuum at 40°C. There remains as residue the crude 1-(1,2-epoxy-3-hydroxy-propyl)-9,10-dihydro-9,10-ethano-anthracene, which is recrystallized from ether/hexane and melts at 158°–159°C.

7.6 Grams (27.3 mmols) of 1-(1,2-epoxy-3-hydroxy-propyl)-9,10-dihydro-9,10-ethano-anthracene are dissolved in 250 ml of absolute ether. The solution is treated with 3.5 g (42 mmols) of dihydropyrane and 0.38 g (2 mmols) of p-toluenesulphonic acid dihydrate, and the whole mixture is stirred at room temperature for 24 hours. The batch is then treated with 25 ml of N sodium hydrogen carbonate solution, the layers are separated, and the ether solution is washed until neutral with 2 × 50 ml of water. The organic phase is dried over sodium sulphate and subsequently evaporated in a water jet vacuum, to leave as residue crystalline 1-[1,2-epoxy-3-(2-tetrahydropyranyloxy)-propyl]-9,10-dihydro-9,10-ethano-anthracene, which melts at 99°–100°C after recrystallization once from ether/hexane.

3.5 Grams (9.7 mmols) of 1-[1,2-epoxy-3-(2-tetrahydropyranyloxy)-propyl]-9,10-dihydro-9,10-ethano-anthracene are dissolved in 60 ml of absolute tetrahydrofuran and the solution is cooled to 0°C by means of an ice-water bath. The solution is treated dropwise with stirring and under nitrogen with a solution of 11 mmols of lithium diphenylphosphide in 35 ml of absolute tetrahydrofuran [prepared from 2.42 g (11 mmols) of diphenyl-chloro-phosphine and 0.77 g (110 mmols) of lithium]. The resulting red reaction solution is then heated to the boil for 6 hours under nitrogen and with stirring, in the process of which it gradually turns light yellow in color. The reaction solution is then stirred for 15 hours at room temperature, when a white precipitate gradually forms, and is subsequently concentrated in a water-jet vacuum. The residue is treated with 150 ml of ether and 50 ml of water. The layers are separated and the ether phase is washed with 2 × 50 ml of water, dried over sodium sulphate and evaporated in a water-jet vacuum, to leave as residue 4.0 g of crude 1-[3-(2-tetrahydropyranyloxy)-(Z)-1-propenyl]-9,10-dihydro-9,10-ethano-anthracene in the form of a colorless, viscous oil which still contains diphenyl-methyl-phosphine oxide as impurity. The crude product is purified by chromatographing it on 120 g of Alox II/n. The pure 1-[3-(2-tetrahydropyranyloxy)-(Z)-propenyl]-9,10-dihydro-9,10-ethano-anthracene is eluted with benzene in the form of a colorless, viscous oil.

2.7 Grams (7.8 mmols) of 1-[3-(2-tetrahydropyranyloxy)-(Z)-propenyl]-9,10-dihydro-9,10-ethano-anthracene are dissolved in 100 ml of methanol and the solution is cooled to 0°C in an ice-water bath. The solution is treated with 5.7 g (30 mmols) of p-toluenesulphonic acid dihydrate and the mixture is stirred for 1 hour at 0°C. It is then treated with 2.6 g (31 mmols) of sodium hydrogen carbonate and the batch is concentrated in a water jet vacuum. The residue is taken up in 150 ml of ether and washed until neutral with 3 × 50 ml of water. The ether solution is dried over sodium sulphate and evaporated in a water-jet vacuum at a bath temperature of 40°C, to leave as residue 1-(3-hydroxy-(Z)-1-propenyl)-9,10-dihydro-9,10-ethano-anthracene in the form of a viscous, colorless oil.

2.25 Grams (18.5 mmols) of 1-(3-hydroxy-(Z)-1-propenyl)-9,10-dihydro-9,10-ethano-anthracene and 2.0 g (2.6 ml; 15.5 mmols) of ethyl-diisopropylamine are dissolved in 50 ml of absolute methylene chloride and the solution is cooled to −15°C in an ice/sodium chloride freezing bath. Under anhydrous conditions and with stirring, 1.14 g (0.75 ml; 10 mmols) of methanesulphonic chloride are added dropwise at a reaction temperature of −15°C to −10°C. The reaction solution is then left to stand at −5°C for 15 hours in a refrigerator. It is subsequently diluted with 150 ml of ether and the ether solution is washed successively with 2 × 30 ml of ibe cold N sulphuric acid, 2 × 30 ml of N sodium hydrogen carbonate solution, and 2 × 50 ml of water. The ether phase is dried over sodium sulphate and evaporated in a water jet vacuum, to leave as residue crystalline 1-(3-hydroxy-(Z)-1-propenyl)-dibenzo[b,e]-9,10-dihydro-9,10-ethano-anthracene-methanesulphonic acid ester, which melts at 133°–135°C after recrystallization once from methylene chloride/hexane.

EXAMPLE 10

The following compounds, for example, can also be obtained in an analogous manner to that described in Examples 1–8; 9-[3-(β-hydroxyethylamino)-1-propenyl]-9,10-dihydro-9,10-ethano-anthracene, 2-chloro-9-(3-methylamino-1-propenyl)-9,10-dihydro-9,10-ethano-anthracene, 2-chloro-9-(3-dimethylamino-1-propenyl)-9,10-dihydro-9,10-ethano-anthracene, 2-chloro-9-[3-(N'-methylpiperazino)-1-propenyl]-9,10-dihydro-9,10-ethano-anthracene, 2-chloro-9-{3-[N'-(β-hydroxyethyl)piperazino]-1-propenyl}-9,10-dihydro-9,10-ethano-anthracene, 2-chloro-9-(3-cyclopropylamino-1-propenyl)-9,10-dihydro-9,10-ethano-anthracene and 2-chloro-9-[3-(β-hydroxyethylamino)-1-propenyl]-9,10-dihydro-9,10-ethano-anthracene.

EXAMPLE 11

Tablets containing 25 mg of 9-(3-methylamino-(Z)-1-propenyl)-9,10-dihydro-9,10-ethano-anthracene hydrochloride may be prepared with the following ingredients:

| | Per tablet |
|---|---|
| 9-(3-methylamino-(Z)-1-propenyl)-9,10-dihydro-9,10-ethano-anthracene hydrochloride | 25 mg |
| lactose | 34 mg |
| wheat starch | 30 mg |
| colloidal silicic acid | 5 mg |
| talc | 5 mg |
| magnesium stearate | 1 mg |
| | 100 mg |

Method

The active substance is mixed with the lactose, part of the wheat starch, and with colloidal silicic acid, and the mixture passed through a sieve. Another portion of the wheat starch is pasted with the five-fold quantity of water on a water bath, and the powder mixture is kneaded with the paste until a slightly plastic mass is obtained. The mass is forced through a sieve, dried, and the dry granulate is again passed through a sieve. Then the remainder of the wheat starch, talc and magnesium stearate are admixed. The resulting mixture is compressed into tablets of 100 mg each.

We claim:

1. A compound of the formula

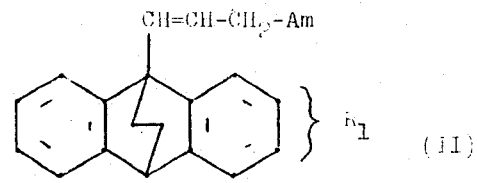

wherein Am is a mono- or di-lower alkylamino group or a hydroxy-lower alkylamino group in which alkyl has up to 7 carbon atoms, or a cycloalkylamino group with from 3 to 7 ring members, and $R_1$ is a lower alkyl or alkoxy group having up to 7 carbon atoms, a trifluoromethyl group, halogen or hydrogen atom, and pharmaceutically acceptable scope thereof.

2. A compound as claimed in claim 1, said compounds being compounds of the formula

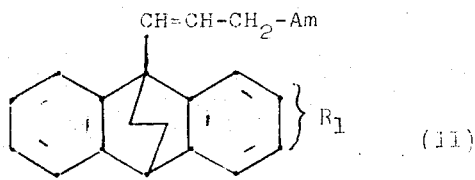

(II)

wherein $R_1$ represents a lower alkyl or alkoxy group having up to 7 carbon atoms, a trifluoromethyl group or a bromine, chlorine or hydrogen atom and Am represents an amino group which is monosubstituted by a $C_{3-7}$-cycloalkyl radical or is monosubstituted or disubstituted by $C_{1-6}$-alkyl groups, and pharmaceutically acceptable salts thereof.

3. A compound as claimed in claim 1, said compounds being compounds of the formula

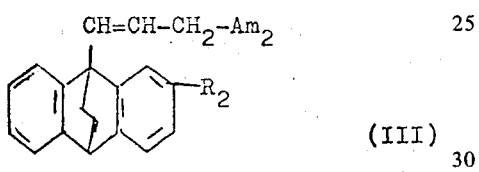

(III)

wherein $R_2$ represents a methoxy group, a trifluoromethyl group, a chlorine atom or a hydrogen atom and $Am_2$ denotes the diethylamino or monoethylamino group, the dimethylamino group or the monomethylamino group, and pharmaceutically acceptable salts thereof.

4. A compound as claimed in claim 1, said compounds being 9-(3-methylamino-1-propenyl)-9,10-dihydro-9,10-ethano-anthracene of the formula

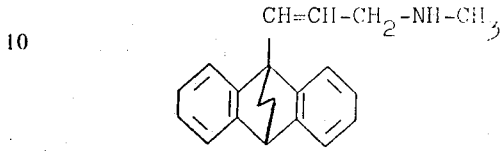

and pharmaceutically acceptable salts thereof.

5. A compound as claimed in claim 1, wherein the 1-propenyl radical is in the Z-configuration.

6. A compound as claimed in claim 1, said compound being 9-(3-methylamino-(Z)-1-propenyl)-9,10-dihydro-9,10-ethano-anthracene of the formula

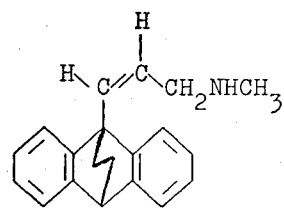

and pharmaceutically acceptable salts thereof.

* * * * *